3,076,476
PISTON TYPE MULTIPORT VALVE
Rodney B. Campbell, Glendale, Calif., assignor to Malcolm R. Maben, Burbank, Calif., trustee
Filed May 5, 1959, Ser. No. 811,102
1 Claim. (Cl. 137—622)

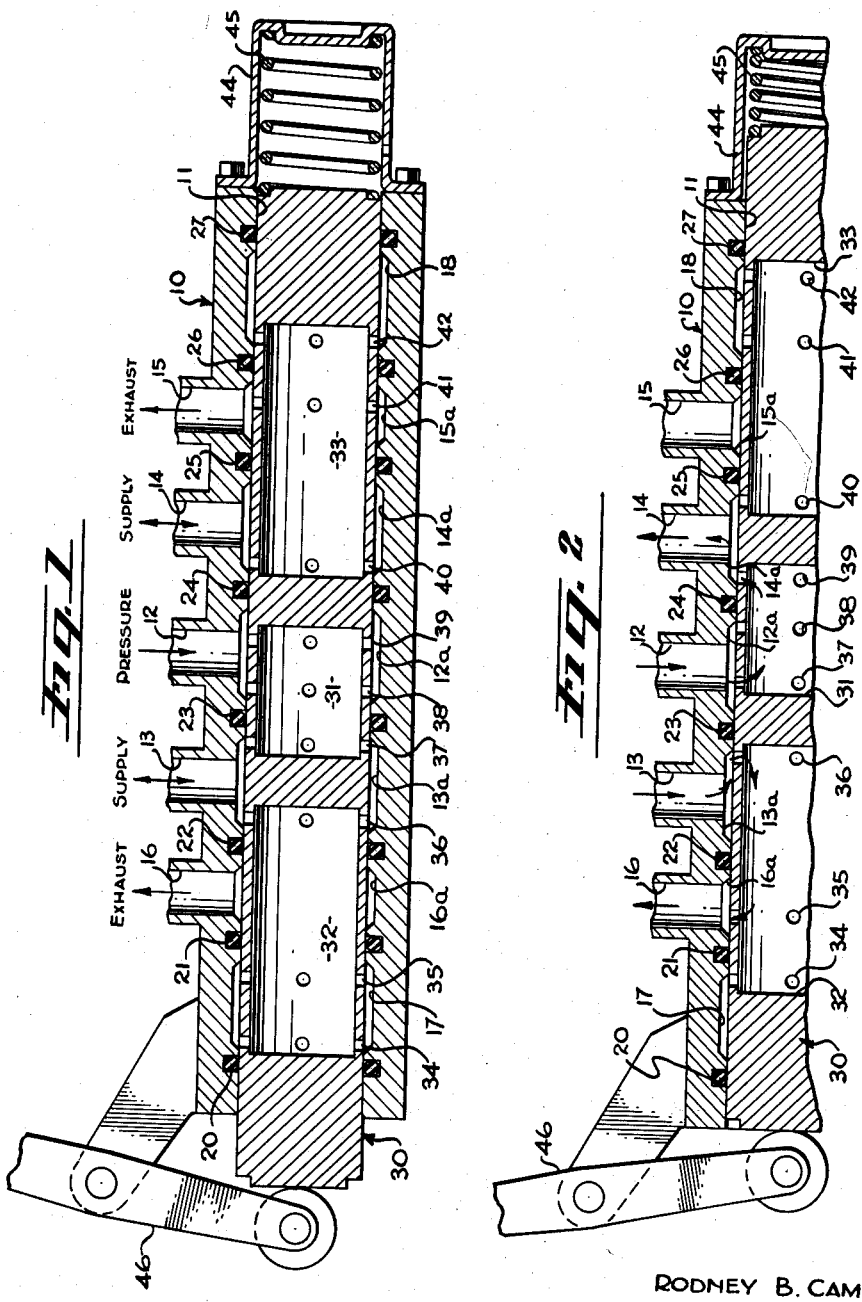

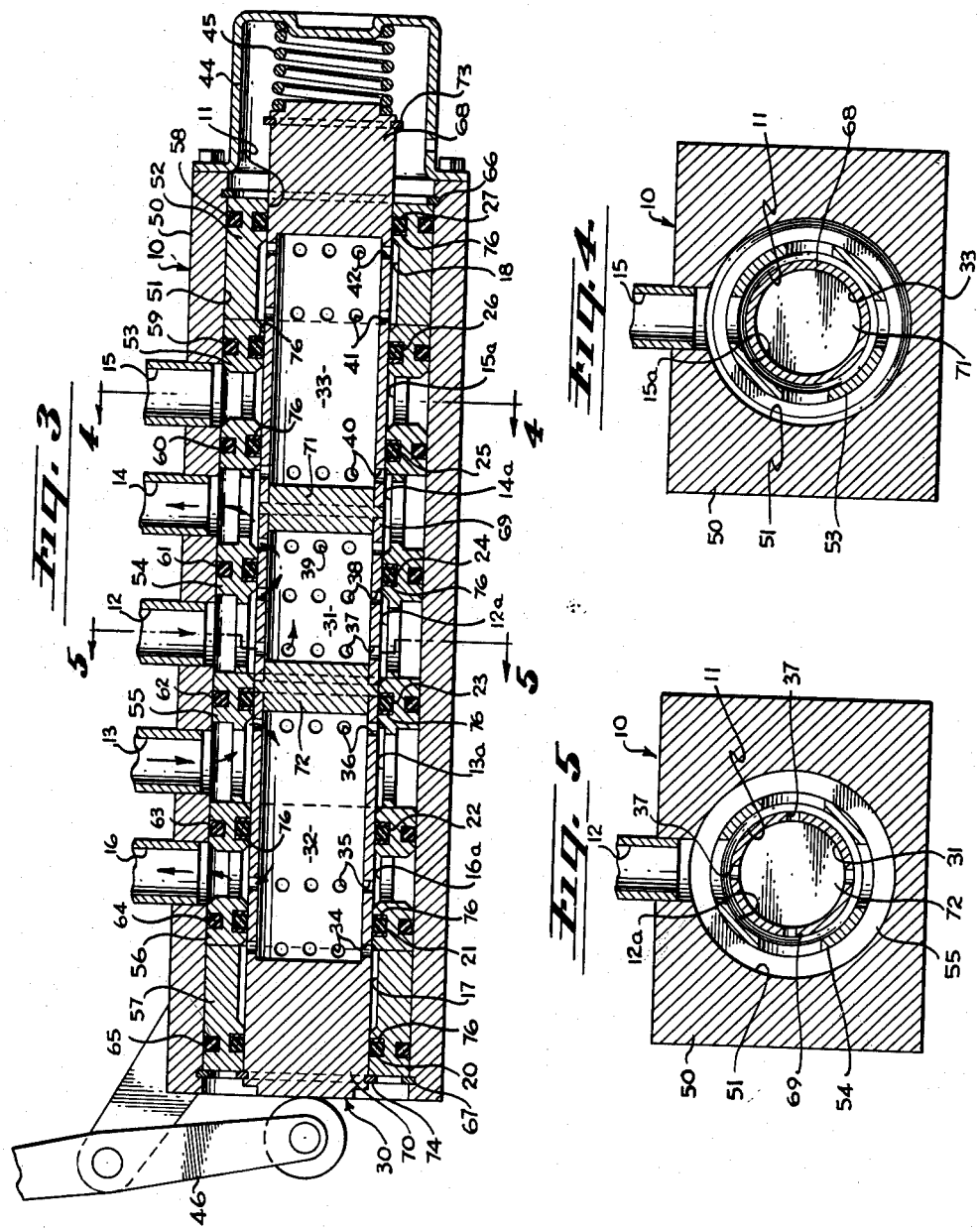

This invention relates to a fluid valve, and more particularly to such a valve of the selector type having a valve body with a cylindrical bore therein in which a valve piston is axially reciprocable to control flows of fluid through the valve.

Such valves are normally provided between a pump or other high pressure fluid source, an actuating cylinder having a power piston therein, and a low pressure fluid reservoir. The valve in one position of operation directs high pressure fluid to one end of the actuating cylinder to move the piston therein in one direction, at the same time opening the other end of the actuating cylinder to the low pressure fluid reservoir. The valve in the other position of operation reverses the fluid flows to and from the actuating cylinder.

In such conventional valves having a reciprocable valve piston, there are normally fluid ports in the valve body and fluid ports in the piston, with O-rings or other annular seals between the valve body and the valve piston. If such O-rings are in the valve body, piston ports must move across them in changing the position of the piston relative to the body. If the O-rings are in the piston, they must move across fluid ports in the valve body in changing the position of the valve piston. In either event normally there are fluid pressure differentials across the O-rings which either substantially increase the actuation forces required to move the valve piston or which cause substantial fluid leakage past the O-rings as the fluid ports move over the O-rings, or both, either of which is very objectionable.

It is a primary object of this invention to provide such a valve in which the foregoing disadvantage of conventional valves are minimized or eliminated. I accomplish this by providing such a valve in which wherever there is a relative movement of a fluid port relative to an O-ring and past it, the port moves either from an area of high fluid pressure to an area of low fluid pressure or between areas of substantially equal fluid pressures.

A further object of this invention is to provide such a valve which is simple and cheap to manufacture, assemble and disassemble.

Other objects and advantages will appear from the following specification and from the drawings which are for the purpose of illustration only, and in which:

FIG. 1 is a simplified longitudinal sectional view of the invention, showing the valve in a first position of operation;

FIG. 2 is a fragmentary view of a portion of FIG. 1 showing the valve in a second position of operation;

FIG. 3 is a complete detailed view showing the valve in the second actuated position of FIG. 2;

FIG. 4 is a cross-sectional view taken on the line 4—4 of FIG. 3; and

FIG. 5 is a cross-sectional view taken on the line 5—5 of FIG. 3.

Referring to the drawing, FIG. 1 diagrammatically or schematically shows a valve body or housing 10 having a longitudinal bore 11. The housing 10 has a pressure inlet port 12, cylinder ports 13 and 14, and exhaust ports 15 and 16, which communicate with annular grooves 12a, 13a, 14a, 15a, and 16a in the bore 11. Also formed in the bore 11 are end grooves 17 and 18. Carried in suitable additional annular grooves in the bore 11 are O-rings 20, 21, 22, 23, 24, 25, 26 and 27.

Axially movable in the bore 11 is a cylindrical valve member 30 providing a central chamber 31, and end chambers 32 and 33. The end chamber 32 is provided with a series of circumferentially spaced radial ports 34, 35 and 36. The central chamber 31 is provided with a series of circumferentially spaced radial ports 37, 38, and 39. The end chamber 33 has a series of circumferentially spaced radial ports 40, 41 and 42.

The housing 10 has an end cap 44 suitably secured thereto and containing a coil spring 45 which engages one end of the valve member 30 and biases it to the left as seen in FIG. 1. Engaging the other end of the valve member 30 is an actuating lever 46 which may be moved to move the valve member axially to the right as seen in FIG. 1.

The pressure inlet port 12 is connected to a source of fluid under pressure (not shown). The cylinder ports 13 and 14 may be connected to opposite ends of a hydraulic cylinder (not shown) to reciprocate a piston therein, as is well known in the art. The exhaust ports 15 and 16 are connected to a low pressure point of discharge (not shown).

In operation, with the device in the first actuated position illustrated in FIG. 1, high pressure fluid flows into the housing through the pressure inlet port 12, flowing through the annular groove 12a into radial ports 38 and 39, into the central chamber 31, and therethrough and out through the radial ports 37 into the annular groove 13a and out of the housing through the cylinder port 13 to a point of use. High pressure fluid also flows from the groove 13a inwardly through the radial ports 36 into the end chamber 32 and thence through the radial ports 34 and 35 into the annular groove 17. At the same time, spent operating fluid at low pressure flows into the housing through the cylinder port 14, through the annular groove 14a, inwardly through the radial ports 40 and into and through the end chamber 33, passing outwardly through the radial ports 41 into the annular groove 15a and thence out of the housing through the exhaust port 15. At the same time the annular groove 18 is opened to the low pressure in the chamber 33 by the radial ports 42.

In this position of operation, there is high pressure in the annular groove 17 and low pressure in the groove 16a, to provide a rightward acting pressure differential across the O-ring 21; high pressure in the groove 13a and low pressure in the groove 16a to provide a leftward acting pressure differential across the O-ring 22; high pressures in the grooves 13a and 12a, to provide balanced pressures across the O-ring 23, high pressure in the groove 12a and low pressure in the groove 14a, to provide a rightward acting pressure differential across the O-ring 24; low pressure in the grooves 14a and 15a, to provide balanced pressures across the O-ring 25; and low pressures in the grooves 15a and 18 to provide balanced pressures across the O-ring 26.

When it is desired to reverse the flows in the cylinder ports 13 and 14, the actuating lever 46 is operated to move the valve member 30 to the right from the first actuated position shown in FIG. 1 to the second actuated position shown in FIG. 2. In the position shown in FIG. 2, the pressure inlet port 12 is in communication with the cylinder port 14 through the central chamber 31, the cylinder port 13 is in communication with the low pressure exhaust port 16 through the end chamber 32, and the exhaust port 15 is blanked off.

In moving from the position shown in FIG. 1 to that shown in FIG. 2, certain of the radial ports in the valve member 30 pass O-rings in the bore 11, and the fluid pressures acting on such O-rings during such movement is an important feature of this invention. Thus, the radial ports 35 must move past the O-ring 21, and in doing so there is a fluid pressure differential across the O-ring in the direction of movement of the valve member 30 until after the ports 35 clear the O-ring 21. The radial ports 37 move past the O-ring 23, and until the ports 37 pass out of registry with the annular groove 13a, there is high pressure on both sides of the O-ring and the fluid pressures thereon are balanced. The ports 39 move past the O-ring 24 and during such movement there is a fluid pressure differential across the O-ring in the direction of movement of the valve member until the ports clear the O-ring. The ports 41 move past the O-ring 26, but during such movement there is low pressure on both sides of the O-ring and balanced fluid pressures thereon.

In moving the valve member 30 from the position shown in FIG. 2 to that shown in FIG. 1, the same radial ports move across the same O-rings, but the pressure balances and differentials are different. However, in both directions of movement of the valve member 30 each radial port which passes an O-ring passes either from an area of high pressure to an area of low pressure or the fluid pressures across the O-ring are balanced. Thus, in the rightward movement of the radial ports 35, they move from an area of high pressure to an area of low pressure, whereas, in their leftward movement there are low balancing pressures on both sides of the O-ring 21. In the rightward movement of the radial ports 37 there are balancing high pressures on both sides of the O-ring 23, whereas in their leftward movement they move from a high pressure to a low pressure area. In the rightward movement of the radial ports 39 they move from a high pressure area to a low pressure area, whereas in their leftward movement there are balancing high pressures on both sides of the O-ring 24. In the rightward movement of the radial ports 41 there are balancing low pressures on both sides of the O-ring 26, whereas in their leftward movement they move from a high pressure area to a low pressure area.

FIG. 3 of the drawing shows the valve of this invention in a detailed preferred embodiment, in which the same reference numerals are used to designate similar parts as in FIGS. 1 and 2.

Referring to FIG. 3, the housing 10 is formed of an outer shell 50 having a cylindrical bore 51 in which are axially aligned abutting tubular members 52, 53, 54, 55, 56 and 57, which provide the internal bore 11. The tubular member 52 carries the O-ring 27 in a suitable internal groove and also has an external O-ring 58 in a suitable external groove. The tubular member 53 carries the internal O-rings 26 and 25 and also has external O-rings 59 and 60 in suitable annular grooves. The tubular member 54 carries the internal O-ring 24 and also has an external O-ring 61 in suitable annular grooves. The tubular member 55 carries the internal O-ring 23 and also has an external O-ring 62 in suitable annular grooves. The tubular member 56 carries the internal O-rings 22 and 21 and also has external O-rings 63 and 64 in suitable annular grooves. The tubular member 57 carries the internal O-ring 20 and also has an external O-ring 65 in suitable annular grooves. The external O-rings 58 to 65 inclusive, form axially spaced fluid seals between the bore 51 of the outer shell 50 and the exteriors of the tubular members 52 to 57, inclusive. The tubular member 52 carries the internal groove 18. The tubular member 53 carries the internal groove 15a. The tubular member 54 carries the internal grooves 14a and 12a. The tubular member 55 carries the internal groove 13a. The tubular member 56 carries the internal groove 16a, and the tubular member 57 carries the internal groove 17. The end tubular members 52 and 57 are retained in the outer shell 50 by snap rings 66 and 67, respectively.

In the form shown in FIG. 3, the piston valve member 30 is made up of axially aligned sections 68, 69 and 70, the sections 68 and 69 being separated by a partition 71 to which they are press-fitted, and brazed or otherwise joined in a fluid-tight joint, and the sections 69 and 70 being separated by a partition 72 to which they are press-fitted and brazed or otherwise joined in a fluid-tight joint. The outer sections 68 and 70 carry in suitable grooves at their outer ends snap rings 73 and 74, respectively, which serve as stops to limit axial travel of the valve member 30.

It is also to be noted that in the form shown in FIG. 3, abutting each of the internal O-rings 20 to 27, inclusive, there are scraper rings 76, preferably of Teflon or other similar plastic material, which are substantially rectangular in cross-section and serve to scrape any solid contaminant matter, such as metallic chips, sand, dust, or the like from the outer surface of the piston valve member 30 and protect their respective O-rings from contaminant and abrasive material that would tend to move past the O-rings when the piston valve member 30 is moved axially.

The device as shown in FIG. 3 is very simple to manufacture, assemble, and disassemble.

Although I have shown and described a preferred embodiment of the invention, it is to be understood that I do not intend to be limited thereto, but desire to be afforded the full scope of the following claims:

I claim as my invention:

In a valve, the combination of:
- a housing having a cylindrical bore and having first, second, and third housing ports communicating with said bore at longitudinally spaced areas, said first housing port being a pressure inlet opening, said second housing port being a supply opening, and said third housing port being an exhaust opening, said housing having first annular groove around said bore between said first and second housing ports, said housing having a second annular groove around said bore between said second and third housing ports;
- a cylindrical valve member in said bore and having first and second longitudinally spaced chambers therein, each of said chambers communicating with said bore through a plurality of radial ports;
- first loose annular sealing means in said first annular groove and adapted to form a fluid seal between said housing and said valve member;
- second loose annular sealing means in said second annular groove and adapted to form a fluid seal between said housing and said valve member;
- annular scraper means in each of said annular grooves and abutting the sealing means therein to prevent contaminants on said valve member from contacting said sealing means when said valve member is moved axially; and
- means for moving said valve member axially, said radial ports upon relative movement to a sealing means and past said sealing means being characterized in moving either from an area of high fluid pressure to an area of low fluid pressure or between areas of substantially equal fluid pressures.

References Cited in the file of this patent

UNITED STATES PATENTS

| | | |
|---|---|---|
| 2,132,030 | Hunt | Oct. 4, 1938 |
| 2,645,450 | Chessman | July 14, 1953 |
| 2,675,024 | Clark | Apr. 13, 1954 |
| 2,862,736 | Russell | Dec. 2, 1958 |
| 2,895,772 | Chapman et al. | July 21, 1959 |
| 2,899,939 | Norris | Aug. 18, 1959 |
| 2,910,050 | Dotter et al. | Oct. 27, 1959 |